Patented May 2, 1944

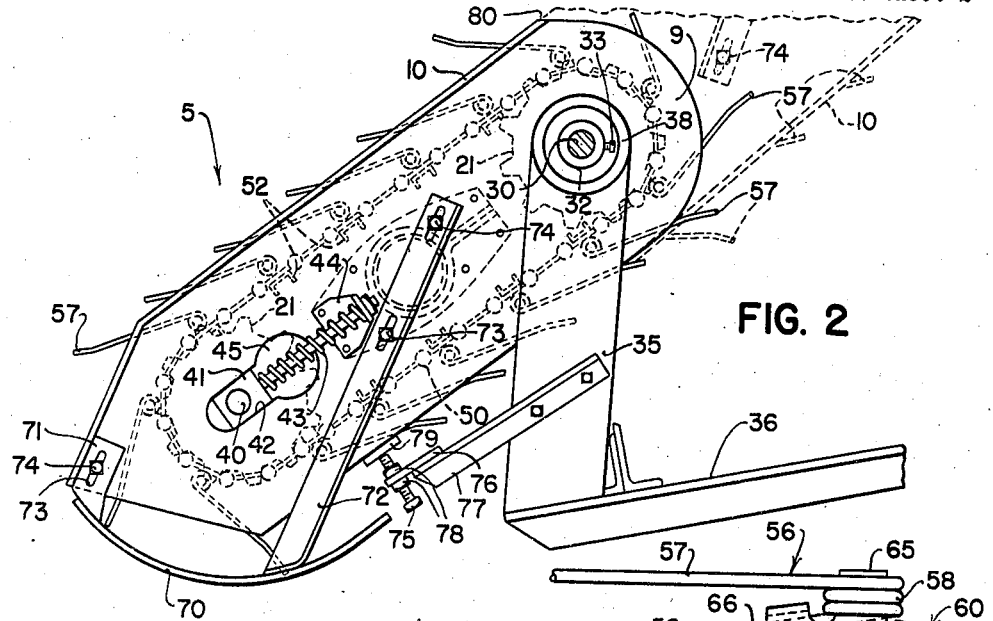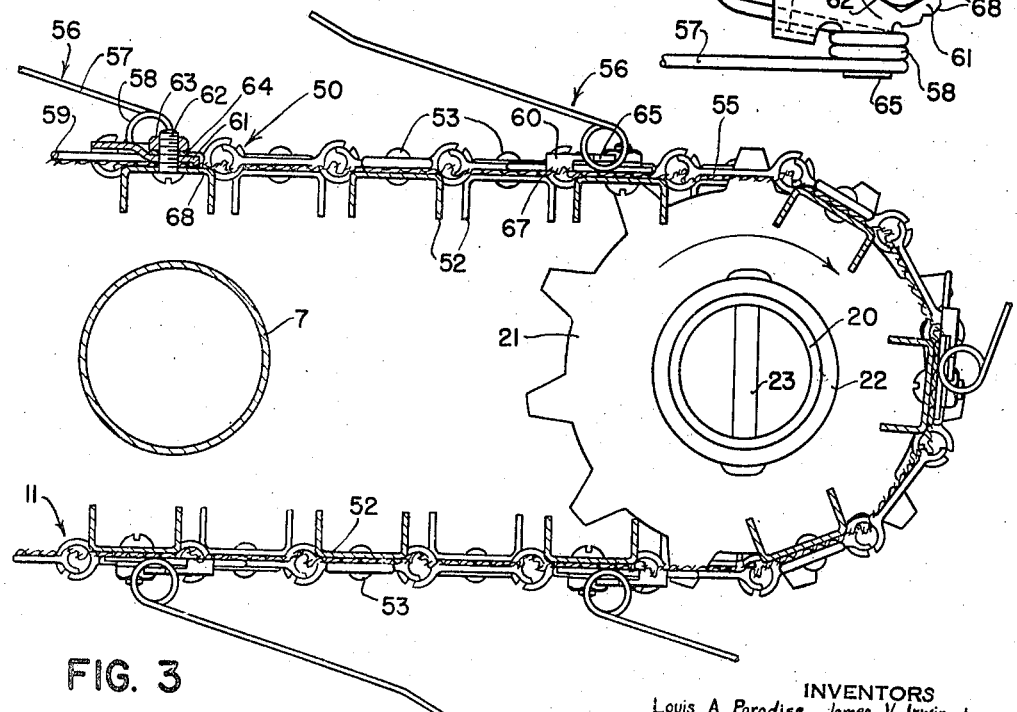

2,347,926

UNITED STATES PATENT OFFICE 2,347,926

PICKUP MECHANISM

Louis A. Paradise and James V. Irwin, Moline, and Floyd R. Martin, East Moline, Ill., assignors to Deere & Company, Moline, Ill., a corporation of Illinois Application December 19, 1941, Serial No. 423,648

6 Claims. (Cl. 56—364)

The present invention relates generally to pickup mechanisms for travelling harvesters such as combines and the like and more particularly to grain pick-ups comprising a flexible belt, which travels between fore and aft spaced rollers and is provided with crop-engaging fingers adapted to lightly brush the ground as they pass around the lower roller, and is in the nature of an improvement over Patent No. 2,253,797, granted August 26, 1941, to Melroe. This patent discloses a pick-up device in which the teeth are fastened directly to the belt and are of such flexibility that as they brush the ground, they are incapable of dislodging small rocks and stones of the size of a walnut or larger, and therefore do not have a tendency to kick the stones forwardly onto the windrow where they are picked up with the harvested material and taken into the crop treating machine, as in some earlier types of pick-up mechanisms. In case any sizeable stones do happen to lodge upon the belt, they are free to roll forwardly over the front end of the belt, since there are no transverse slats on top of the belt which might engage and carry the stones into the combine.

Since the belt is driven by the upper roller through frictional contact with the belt, there is some tendency for the belt to slip when operating under extremely difficult conditions, and therefore it is the principal object of the present invention to provide a positive drive for the pick-up belt. In the accomplishment of this object, we have contemplated the use of a pair of laterally spaced drive chains operating over fore and aft spaced sprockets and connected to the belt by means of transverse slats, which are connected at their opposite ends to the two chains. We are aware, however, that the use of drive chains with transverse slats for driving a belt pick-up or conveyor is not broadly new, but as far as we are aware, the slats have always been attached to the belt on the outer surface thereof, with the crop-engaging fingers fastened to the outer sides of the slats. The great objection to these prior devices, however, was that these exposed slats carried rocks and stones into the combine, and in certain parts of the country the farmers have had a great deal of difficulty because of cylinder breakage caused by stones being carried into the cylinder of the combine. It was due to these difficulties, that the pick-up device disclosed in the above-mentioned patent, was developed.

It is a more particular object of our invention, therefore, to provide a belt type pick-up having a positive chain drive, but without any slats disposed in such position that they can convey stones into the combine. In the accomplishment of this object, we have provided a belt type pick-up conveyor, in which the belt or apron is positioned between the slats and the fingers. In this arrangement, the slats are not in a position in which they can engage rocks and stones, and yet this construction permits the advantages of the slats for driving purposes. This construction also permits the use of a much lighter belt or apron, since all of the driving power is transmitted through the chains and slats uniformly to the belt, and since the crop engaging fingers can now be supported on the slats instead of being independently fixed to the belt, the latter can be fabricated of canvas of the usual weight employed in platform conveyors, or even lighter weight. By providing a slight amount of slack between each pair of adjacent slats, all driving tension is relieved from the canvas and taken by the chains and slats.

A further object of our invention relates to the provision of a novel and improved means for securing the finger members to the endless belt.

Still another object has to do with the provision of means for mounting a pick-up device on a harvester platform whereby the pick-up is free to float along the ground on ground engaging skids, wheels or the like, but with provision for adjustably limiting the extent of downward movement during operation. A related object is to provide for swinging the pick-up frame upwardly to an over-center transport position above the harvester platform. Stop means are provided for holding the device out of contact with the platform.

These and other objects and advantages of my invention will be apparent to those skilled in the art after a consideration of the following description, taken in conjunction with the drawings appended hereto, in which Figure 1 is a plan view of a pick-up mechanism embodying the principles of my invention, certain parts being broken away and shown in section to more clearly disclose the details of construction;

Figure 2 is a side elevational view of the pick-up mechanism;

Figure 3 is a sectional elevational view taken along a line 3—3 in Figure 1 and drawn to an enlarged scale; and Figure 4 is an enlarged plan view of one of the spring finger members.

Figure 1:
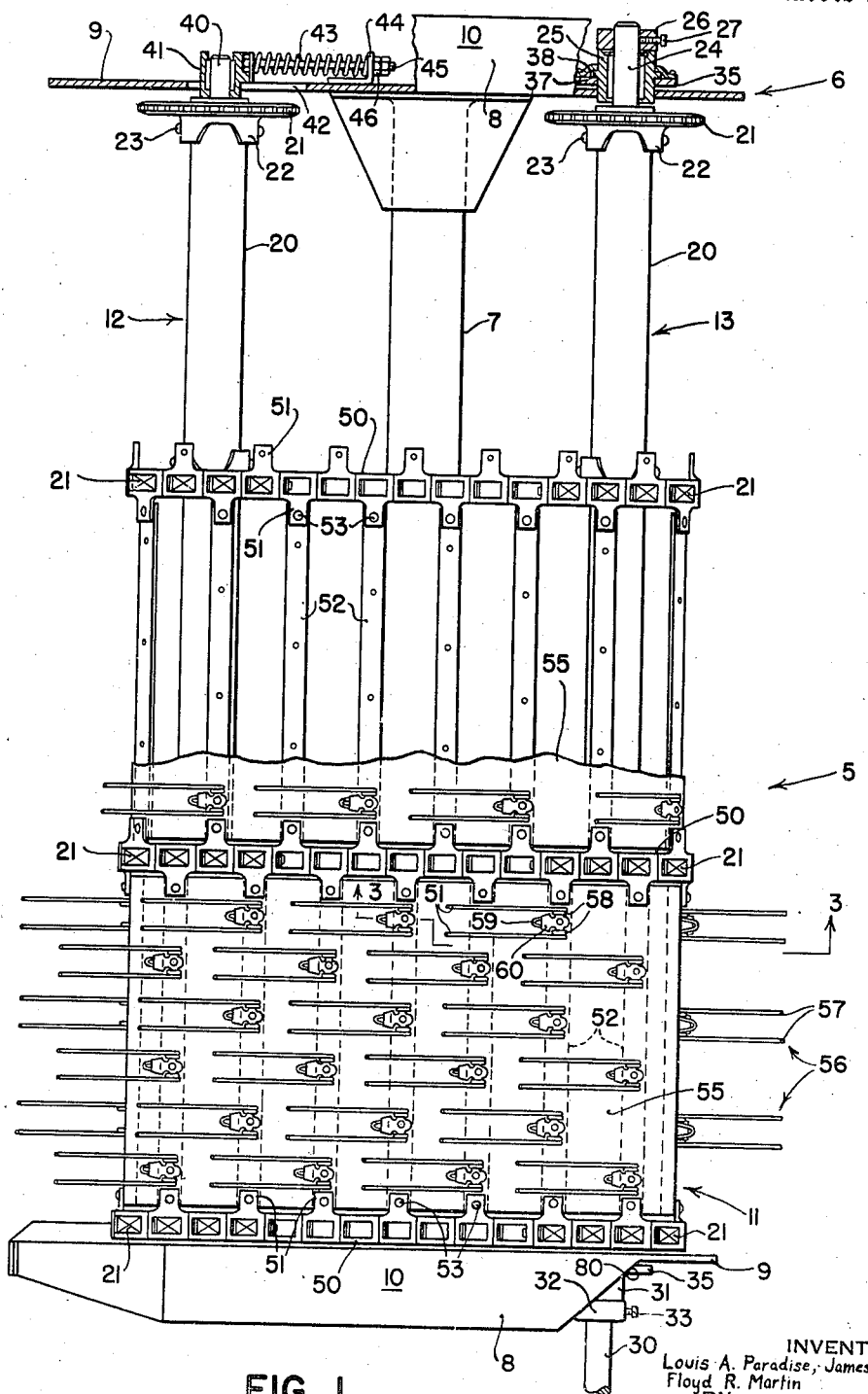

Referring now to the drawings, the pick-up device, indicated in its entirety by the reference numeral 5, includes a rigid supporting frame 6 comprising a main transversely disposed tubular frame member 7, rigidly fixed at opposite ends thereof, respectively, to a pair of side frame members 8, each of which includes a vertical side wall 9 and an outwardly turned upper flange 10. Carried on the frame 6 is an endless type conveyor 11, trained over a pair of transversely disposed, front and rear supporting rollers 12, 13.

The rear supporting roller 13 comprises a tubular shaft 20 on which are fixed a plurality of laterally spaced sprockets 21, each of which has a supporting hub 22 through which the tubular shaft 20 extends and is fixed thereto by means of a bolt or rivet 23 to prevent turning of the hub 22 on the shaft 20. One end of the tubular shaft 20 is rigidly fixed to a stub shaft 24, journaled in a bearing 25, which is suitably fixed to the web 9 of the side frame member 8. The stub shaft 24 is retained within the bearing 25 by a collar 26 secured to the outer end of the shaft 24 by a set screw 27.

The opposite end of the rear roller 13 is supported on a drive shaft 30, which is carried in a bearing 31, any end thrust being taken by a collar 32, fixed to the shaft by means of a set screw 33. The two bearings 25, 31 are supported on a pair of generally vertical legs 35, which are rigidly carried on the frame 36 of the harvester platform. Each of the bearings 25, 31 is provided with an annular flange 37, which is secured to the leg 35 by means of a suitable clip 38.

The forward roller 12 comprises a similar tubular shaft 20 on which the sprockets 21 are supported, each end of the tubular shaft 20 being rigidly carried on a stub shaft 40, which is journaled in a bearing member 41, the latter being slidably disposed within a slot 42 in the side 9 of the frame member 8. Each of the bearings is urged forwardly in the slot by means of a coiled compression spring 43 acting against the side of the bearing 41 and reacting against a clip 44 fixed to the side wall 9. A bolt 45 extends from the bearing 41 through the center of the coil spring 43 and through a suitable aperture in the clip 44, and is secured by nuts 46 on the rear side of the clip. By means of the spring 43 the tension in the endless conveyor 11 is maintained substantially constant.

Trained over each pair of fore and aft aligned sprockets 21 is an endless drive chain 50, each chain comprising a series of interconnected links, each of which is provided with a lug 51 extending laterally therefrom. As will be noted in Figure 1, the preferred embodiment of this invention employs four drive chains 50, spaced laterally at equal distances to provide three conveyor sections. The two inner chains 50 have their lugs 51 extending laterally in alternate directions, while the outer chains are provided with a lug 51 on every other link. The lugs 51 on adjacent chains are transversely aligned, and each pair of opposed, aligned lugs 51 is interconnected by a transversely disposed slat 52. Each of the slats 52, in this embodiment, is in the form of a metal channel, and is fixed at opposite ends thereof, respectively, to the aligned lugs by means of suitable rivets 53. The channel-shaped slats are positioned with their flanges extending inwardly of the endless chains. The slats are positioned against the inner surfaces of the lugs 51.

An endless belt or apron 55, preferably made of canvas or the like, extends around the outer sides of the channel-shaped slats 52 and is securely fastened between each of the slats and its associated lugs 51, by the rivets 53 which pass through suitable apertures provided in the canvas, slats, and lugs. Each of the aprons, of which there are three in number in this embodiment, is substantially coextensive with the length of the slats in the respective section, the two edges of each belt or apron being adjacent the inner sides of each pair of adjacent chains, as indicated in Figure 1.

A row of spring finger members 56 is attached to each one of the slats. As disclosed in the Melroe patent, each finger member 56 is made out of a single piece of wire of about No. 14 gauge, each member comprising a pair of parallel tines or fingers 57 terminating in spring coils 58 connected by a loop 59, as best shown in Figure 4. Each member is secured to the conveyor by means of a clip 60 made of sheet metal and having a central bolting section 61, which is suitably apertured to receive a bolt 62, which extends through aligned apertures in the slats 52 and the canvas apron 55. The clip is placed on top of the belt 55 over the spring finger member 56 and is fastened thereto by means of a nut 63 and lock washer 64. The clip 60 has a pair of laterally extending wings 65 which project through the coil springs 58, and a longitudinally extending body portion 66, which extends over the loop 59 and has a pair of downwardly turning flanges 67, which rest on the belt at each side of the loop. A plurality of pointed teeth 68 around the end of the bolting section 61, are forced into the belt when the nut 63 is tightened.

During operation, the pick-up device is carried on the lugs 35 and inclines forwardly and downwardly from the supporting shafts 24, 30, the forward end of the frame being supported on a pair of curved skids 70, fixed to a pair of fore and aft spaced brackets 71, 72, respectively, each of which is slotted as at 73 to receive bolts 74 by which the brackets are secured to the frame. When the bolts 74 are loosened the skids can be moved up or down relative to the frame and thus control the amount of pressure exerted by the spring fingers 57 as they brush the ground ahead of the platform.

The lower extent of floating movement of the frame is adjustably determined by a pair of stop bolts 75, one on each side of the frame 6, supported in a plate 76, which is welded to an arm 77, the latter being bolted to the adjacent support 35. The bolt 75 is adjustably fixed in position by a pair of lock nuts 78 engaging the bolt on opposite sides of the plate 76. The end of the bolt 75 is adapted to engage a stop lug 79 fixed to the lower edge of the frame side wall 9.

For transport purposes, the pick-up can be swung to an over-center position, indicated in dotted lines in Figure 2. In this position, the device is held over the harvester platform 36 but out of contact therewith by engagement of the rear edge 80 of the flange 10, which engages the rear of the support 35, on each side of the pick-up frame.

The endless conveyor is driven by suitable means attached to the shaft 30 in a direction to cause the upper run of the conveyor to travel upwardly and the lower run to travel downwardly and forwardly. Thus it is evident that the spring fingers 57 extend in a trailing direction with respect to the conveyor, and tend to lift the windrowed crop and transport it upwardly over the pick-up device and discharge it upon the combine platform.

It is evident that the pick-up disclosed herein retains the advantages of the flexible fingers, which do not tend to dislodge the stones from the ground and kick them onto the windrow, and also retains the advantage of the smooth apron, which permits any stones to roll downwardly off the forward end of the pick-up, but has the added advantage over the previous device of a positive chain and sprocket drive for the endless conveyor.

We claim:

1. A pick-up adapted to be attached to a traveling harvester and comprising an endless belt trained over upper and lower rollers, means for supporting said conveyor in a downwardly and forwardly inclined position with the lower end thereof in close proximity to the ground, a plurality of pick-up fingers attached to said belt, means for driving the conveyor with the upper run traveling rearwardly and the lower run traveling forwardly, said fingers being disposed to brush the ground surface as the conveyor belt passes around the lower roller, said fingers being of such degree of flexibility as to be incapable of dislodging stones of walnut size upon the ground upon coming in contact therewith in brushing the ground surface, and a plurality of longitudinally spaced transverse slats disposed on the inner side of said belt and attached thereto.

2. A pick-up adapted to be attached to a traveling harvester and comprising a pair of relatively non-stretchable, laterally spaced, endless drive members trained over upper and lower driving and driven wheels, means for supporting said conveyor in a downwardly and forwardly inclined position with the lower end thereof in close proximity to the ground, a plurality of transversely disposed slats interconnecting said drive members, a relatively stretchable endless conveyor belt extending around the outer sides of said slats and attached thereto, and a plurality of crop engaging fingers disposed on the outer side of said belt and attached thereto.

3. A pick-up adapted to be attached to a traveling harvester and comprising a pair of relatively non-stretchable, laterally spaced, endless drive members trained over upper and lower driving and driven wheels, means for supporting said conveyor in a downwardly and forwardly inclined position with the lower end thereof in close proximity to the ground, a plurality of transversely disposed slats interconnecting said drive members, a relatively stretchable endless conveyor belt extending around the outer sides of said slats and attached thereto, a plurality of pick-up fingers attached to said belt, and means for driving the conveyor with the upper run traveling rearwardly and the lower run traveling forwardly, said fingers being disposed to brush the ground surface as the conveyor belt passes around the lower roller, said fingers being of such degree of flexibility as to be incapable of dislodging stones of walnut size upon the ground upon coming in contact therewith in brushing the ground surface.

4. In a windrow pick-up device, an endless pick-up conveyor comprising a plurality of laterally spaced drive chains, a plurality of transversely disposed slats interconnecting said chains, a row of crop engaging fingers attached to the outer side of each slat, and a flexible apron disposed between said teeth and said slats.

5. A windrow pick-up device comprising a frame and crop engaging mechanism mounted thereon, a drive shaft for said mechanism journaled on said frame, a pair of supports in which said shaft is journaled, said supports being adapted to be fixed to a harvester platform or the like, stop means ahead of said supports for supporting said frame in an operating position forwardly of said supports but permitting the frame to move upwardly therefrom to an over-center transport position behind said supports, and stop means on said frame engageable with at least one of said supports for holding the frame in said transport position.

6. A windrow pick-up device comprising a frame and crop engaging mechanism mounted thereon, a drive shaft for said mechanism journaled on said frame, a pair of supports in which said shaft is journaled, said supports being adapted to be fixed to a harvester platform or the like, to carry said pick-up frame in a forwardly and downwardly inclined operating position, ground engaging means at the forward end of said frame to cause the latter to float about the axis of said drive shaft during operation, a threaded member carried on one of said supports and engageable with the frame to adjustably limit the downward movement thereof, and a fixed stop on said frame and engageable with one of said supports when said frame is swung upwardly to an over-center transport position above the harvester platform.

LOUIS A. PARADISE.
JAMES V. IRWIN.
FLOYD R. MARTIN.